United States Patent Office 2,796,328
Patented June 18, 1957

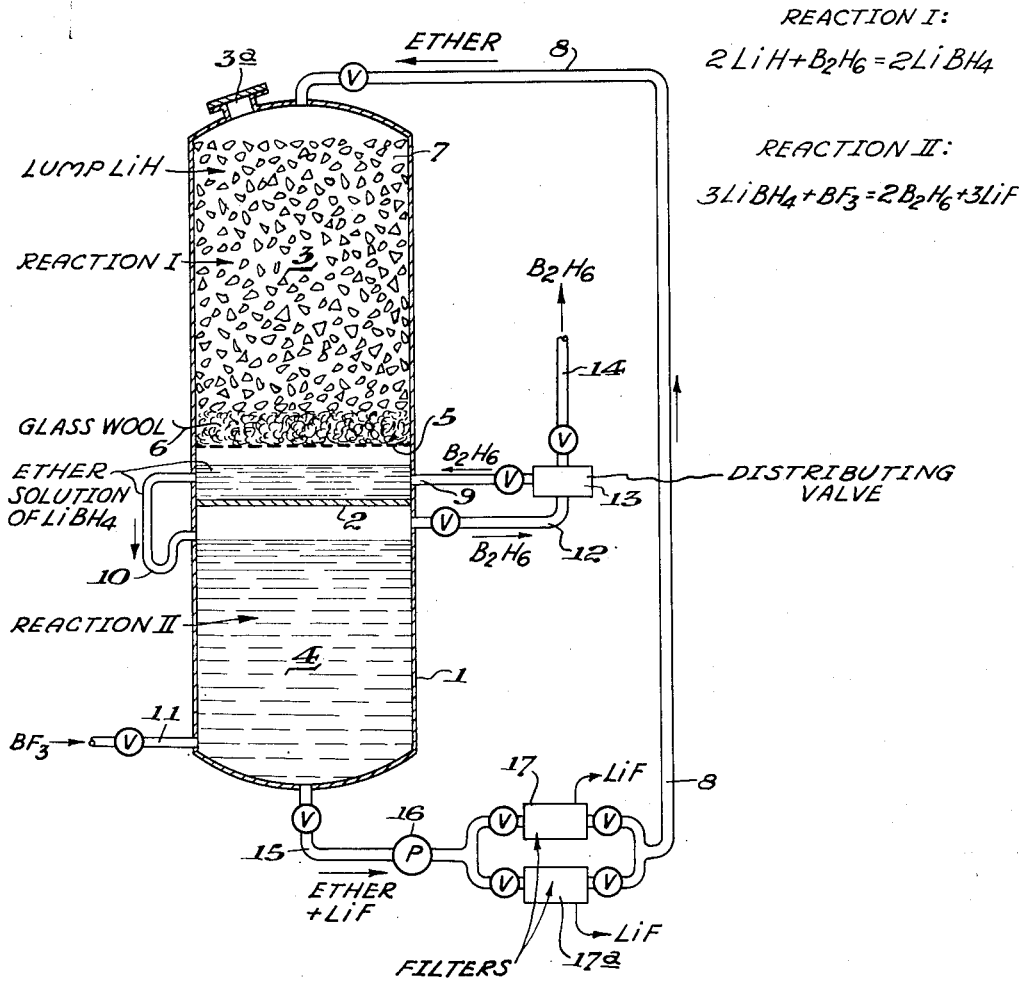

2,796,328

PRODUCTION OF DIBORANE

Carey B. Jackson, Forest Hills, Robert M. Bovard, Mars, and James R. Taylor, Evans City, Pa., assignors, by mesne assignments, to Callery Chemical Company, Pittsburgh, Pa., a corporation of Pennsylvania Application May 1, 1948, Serial No. 24,528

6 Claims. (Cl. 23—204)

This invention relates to the production of diborane.

Various ways of making diborane ($B_2H_6$) have been proposed and tried. One of the standard practices heretofore has been to treat magnesium boride with an acid. This results in the evolution of a mixture of boron hydrides from which dihydrotetraborane ($B_4H_{10}$) may be separated by careful fractionation. That compound is decomposed when heated with production largely of diborane. The procedure is involved and roundabout, yields are low, the fractionation to recover $B_4H_{10}$ is exacting, and the process thus not only requires elaborate apparatus and exceptionally skilled technique but is also time consuming. Diborane has also been made by subjecting a mixture of hydrogen and boron trichloride ($BCl_3$) to a high voltage discharge to form $B_2H_5Cl$ which decomposes to a mixture of diborane and boron trichloride. This method is subject to substantially the disadvantages just stated.

Diborane may be made also by the reaction of boron trifluoride upon an alkali metal hydride, for example lithium hydride, according to the reaction:

$$6LiH + 2BF_3 \rightarrow B_2H_6 + 6LiF$$

Although that method is simpler than those described above, and is more direct, it is equally subject to various disadvantages. Particularly, although the reaction at times starts and runs smoothly, the prevailing tendency is for it not to start until a substantial period of time has elapsed, when surging occurs, usually with sufficient violence to destroy the reaction vessel. The reaction has thus been undependable. Moreover, it involves a solid-gas reaction, which is less desirable than reactions of the liquid-liquid, gas-gas and gas-liquid types. Again, the yields tend to be low, presumably because commercially available lump form of lithium hydride must be ground to supply maximum surface for reaction, and during the grinding there is inevitably exposure to air containing moisture, carbon dioxide and oxygen which react with the hydride and reduce its activity and the yield of diborane per unit of lithium hydride.

A major object of the present invention is to provide a method of making diborane that is simple, easily performed and controlled, that does not require complicated or expensive apparatus, that avoids the necessity of and disadvantages attendant upon the grinding of alkali metal hydrides, that results consistently in higher yields and lower losses than the previously known methods, that is applicable to continuous operation, and that otherwise avoids or minimizes the aforementioned disadvantages of prior practices.

Other objects will appear from the following specification.

The accompanying drawing is a schematic representation of apparatus for the performance of the preferred embodiment of the invention.

We have discovered, and it is upon this that the invention is predicated, that its stated objects are attained by making use of the following two reactions:

$$2LiH + B_2H_6 = 2LiBH_4 [LiH.BH_3] \quad \text{Reaction I}$$
$$3LiBH_4 + BF_3 = 2B_2H_6 + 3LiF \quad \text{Reaction II}$$

Both of these reactions run smoothly and with good yields. In the practice of the invention the reactions are run separately. That is, Reaction I is performed and the product, lithium borohydride ($LiBH_4$), is then separately reacted with boron trifluoride in conformity with Reaction II. $LiBH_4$ is soluble in ether so that by conducting Reaction I in the presence of ether there is supplied a solution of it for Reaction II which therefore becomes a liquid-liquid reaction (since $BF_3$ forms a complex with ether) with attendant benefit of smooth, prompt, and efficient operation.

The invention is based further upon a particular mode of combining Reactions I and II. In accordance with it diborane is reacted with lithium hydride submerged in ether in a closed chamber. The reaction begins smoothly with production of $LiBH_4$ which dissolves in the ether. The solution is withdrawn and passed to a second reaction chamber into which $BF_3$ (or $BF_3$-ether complex) is introduced, whereupon Reaction II occurs with production of gaseous diborane and lithium fluoride, the latter becoming suspended in the ether. The diborane is withdrawn and a portion of it is applied to the performance of Reaction I, the remainder being recovered for desired use.

In this way we are able to provide for continuous or semi-continuous operations if desired. Likewise, by maintaining the lithium hydride submerged or suspended in ether we find that there is prompt, smooth reaction even though the hydride be present in the form of relatively coarse lumps such as are commercially available, so that fine grinding of the hydride is unnecessary. Thus the activity of the hydride is not reduced as it has been in prior practices necessitating grinding of it in a ball mill, which may in part explain why the reaction begins promptly, proceeds smoothly, and yields are high.

In the practice of the invention an amount of lithium hydride is charged into a closed reaction chamber into which the recycled diborane and ether are passed. The ether solution of $LiBH_4$ formed is continuously withdrawn and passed to a second closed reaction chamber while continuously introducing boron trifluoride into it. Similarly, diborane is continuously withdrawn from the second chamber and by means of a distributing valve an appropriate portion of it is passed to the first reaction chamber, and the remainder is condensed or otherwise recovered for desired use. Likewise, the resultant ether suspension of lithium fluoride is withdrawn continuously from the second chamber and is passed through a filter press, or the like, to remove the solid lithium fluoride, the clarified ether then being recycled to the first reaction chamber. By the use of large amounts of lithium hydride charged intermittently into the first reaction chamber, semi-continuous operation is thus possible. Or, by making use of well-known mechanical means, the lithium hydride may be charged periodically into the reaction chamber without interruption of the process, thus providing continuous operation.

Having reference now to the drawing, the method is practiced most suitably in an apparatus which, as schematically shown, takes the form of a vertical reactor 1 of metal inert to the materials present. The reactor is divided by an imperforate partition 2 into an upper reaction chamber 3 and a lower reaction chamber 4. Spaced a short distance above partition 2 is a foraminous diaphragm 5 carrying a layer 6 of glass wool or similar filtering material that is inert with respect to lithium hydride, diborane and ether. Lithium hydride 7 in its commercial lump form is then charged through a charging opening 3a having a cover that may be closed gas tight, to fill chamber 3 with the lumps. Ether is introduced into the top chamber 3 through a conduit 8, and diborane is passed through a conduit 9 into chamber 3 below diaphragm 5. The diborane bubbles upwardly through the diaphragm and into contact with the lithium hydride, with which it reacts to form LiBH4 in accordance with Reaction I. The reaction product is dissolved by the ether flowing downwardly over the lithium hydride, and the solution passes into the space between partition 2 and diaphragm 5, the glass wool or other filter agent acting to prevent the entrainment of lithium hydride in the solution. The solution then passes by gravity through a trap delivery 10 into chamber 4, and boron trifluoride is introduced into the solution through a conduit 11 from a source, not shown. In chamber 4 Reaction II occurs, and the B2H6 is withdrawn through a conduit 12 and passed to a distributing valve 13 which acts to pass a proportioned amount of the gas to conduit 9, the remainder being passed through a conduit 14 for condensation or other desired use.

At the same time the ether suspension of lithium fluoride produced by Reaction II is withdrawn from chamber 4 through a conduit 15 and passed by a pump 16 to one or the other of a pair of filter presses 17 and 17a to separate the lithium fluoride, and the effluent then enters conduit 8 for recycling to chamber 3. Or, the LiF may be removed by centrifuging.

We find that satisfactory operation is to be had by so adjusting the distributing valve 13 that three volumes of the diborane withdrawn through conduit 12 are supplied to conduit 9 for Reaction I for each volume that is withdrawn for use through conduit 14, but other proportioning is possible. Also the reaction system should be operated at the highest temperature practicable for maximum rate of reaction but at the same time the temperature should be regulated to maintain the ether in the liquid state. If operation is conducted at atmospheric pressure, cooling may be required although it will be understood that higher temperatures are permissible if the system is operated under pressure.

Diborane is necessary, of course, to initiate the reaction. This may be drawn from a stock of B2H6 previously prepared, or it may be made in sufficient amount to start the reaction by the use of the processes known heretofore.

It is possible for LiBF4 to form in reaction chamber 4 but this is not serious for it will react with LiBH4 according to the reaction:

$$LiBF_4 + 3LiBH_4 = 2B_2H_6 + 4LiF$$

Although the invention has been described with reference to the use of ether as a solvent for the LiBH4 formed in Reaction I, it will be understood that other solvents may be substituted provided they are inert to the reaction conditions. Also, although the invention has been described with particular reference to the use of lithium hydride, other alkali metal hydrides, such as sodium hydride, may be used for the same purpose. However, lithium hydride is preferred because a higher proportion of hydrogen per molecular weight is available from it than from the other alkali metal hydrodes.

Similarly boron trifluoride may be used as such although various organic complexes of this fluoride are known that are more easily handled and might be substituted. These complexes simply serve, as is well recognized, to supply boron trifluoride, and consequently they are contemplated by the term "boron trifluoride" as used in the claims. Where ether is used as described above, the boron trifluoride etherate is preferable in case a complex of the fluoride is used instead of the gas itself.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:
1. In a process of making diborane, the steps comprising reacting boron trifluoride with a solution of alkali metal borohydride in an inert solvent, withdrawing the diborane thus formed, applying a portion of the withdrawn diborane for separate reaction with lump alkali metal hydride in the presence of said solvent to form solution of alkali metal borohydride, supplying the said solution for said reaction with boron trifluorde, and recovering the remainder of the withdrawn diborane.

2. In a process of making diborane, the steps comprising reacting boron trifluoride with a solution of lithium borohydride in an ether, withdrawing the diborane thus formed, applying a portion of the withdrawn diborane for separate reaction with lump lithium hydride in the presence of ether to form solution of lithium borohydride, supplying the said solution for said reaction with boron trifluoride, and recovering the remainder of the withdrawn diborane.

3. That method of making diborane which comprises the steps of passing diborane into contact with alkali metal hydride in a first closed chamber while supplying an inert solvent for the alkali metal borohydride thus formed, passing the solution to a second closed chamber and introducing boron trifluoride into it therein to form diborane gas and alkali metal fluoride, withdrawing from said second chamber the suspension of alkali metal fluoride in said solvent and, separately, diborane gas, separating lithium fluoride from said suspension and returning the solvent to said first chamber, passing a portion of the withdrawn diborane to treat a further amount of said hydride in said first chamber, and recovering the remainder of the diborane.

4. A method according to claim 3, said hydride being lump lithium hydride.

5. That method of making diborane which comprises the steps of continuously passing diborane into contact with alkali metal hydride in a first closed chamber while supplying an inert solvent for the reaction product, continuously passing the resultant solution of said reaction product to a second closed chamber and there contacting it with boron trifluoride whereby to form diborane and alkali metal fluoride, continuously withdrawing the diborane and applying a portion of it to supply diborane to said first chamber, and recovering the remainder of the diborane, continuously withdrawing from said second chamber suspension of alkali metal fluoride in said solvent, separating the alkali metal fluoride from said suspension, and recycling the solvent to said first chamber.

6. That method of making diborane which comprises the steps of continuously passing diborane into contact with lump lithium hydride in a first closed chamber while supplying an ether as solvent for the reaction product, continuously passing the resultant ether solution of said reaction product to a second closed chamber and there contacting it with boron trifluoride whereby to form diborane and lithium fluoride, continuously withdrawing the diborane thus formed and applying a portion of it to supply the diborane to said first chamber, recovering the remainder of the diborane, continuously withdrawing from said second chamber suspension of lithium fluoride in ether, separating the lithium fluoride from said suspension, and recycling the clarified ether to said first chamber.

References Cited in the file of this patent

UNITED STATES PATENTS

| | | |
|---|---|---|
| 2,469,879 | Hurd | May 10, 1949 |
| 2,543,511 | Schlesinger | Feb. 27, 1951 |
| 2,544,472 | Schlesinger | Mar. 6, 1951 |
| 2,550,985 | Finholt | May 1, 1951 |
| 2,553,198 | Lesesne | May 15, 1951 |
| 2,555,512 | Schlesinger | June 5, 1951 |